PEN ASSEMBLY DEVICE

Filed Feb. 10, 1964

INVENTOR:
EARL BIRKETT
BY Peter L. Tailer
ATTORNEY 3,183,582

PEN ASSEMBLY DEVICE

Earl Birkett, West Hempstead, N.Y.
(392 W. Broadway, New York 12, N.Y.)

Filed Feb. 10, 1964, Ser. No. 343,658
1 Claim. (Cl. 29—200)

This invention relates in general to automatic apparatus for the assembly of ball point pens and, more particularly, to a device which properly seats a cartridge within a pen before the pen is screwed together.

Automatic machines are made having travelling pen holding elements which move intermittently from station to station. Ball point pen parts are manually or automatically dropped into the pen holding elements in a proper position to be screwed together. The pen barrels are first dropped in the pen holding elements, the cartridges follow, and the cap is dropped over the cartridge and barrel. The cartridge extends up into the cap which contains the push rod of the pen push rod actuator. If the pen cartridge does not extend properly into the push rod or pen push rod actuator, the caps cannot properly be screwed onto the barrels.

Before this invention, vibrating devices were used to move the cartridges about and allow them to finally enter the action within the pen cap. These vibrating devices are expensive and they often malfunction.

It is, therefore, a main object of this invention to provide a less expensive and more reliable device for use with an automatic pen assembly machine, which device causes the pen cartridge to enter the action in the pen cap.

Many other objects, advantages and features of invention will become apparent from the following description and accompanying drawing wherein.

Figure 3:
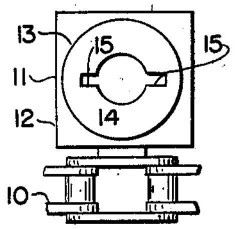
FIGURE 3 is a top view of a fragment of chain and a pen holding element of an automatic pen assembling machine.

Referring to the drawing in detail, chain 10, which could also be the periphery of a wheel or any other suitable device, has the pen holding elements 11 fixed to it at regular intervals. As shown, the pen holding elements 11 have square lower portions 12 and cylindrical upper portions 13. A bore 14, as shown in FIGURE 3, extends vertically through each element 11. The bore 14 is made large enough to accommodate the barrel and cap of a ball point pen. One or more vertical slots 15 are provided to receive the clip fixed to the cap of a pen being assembled.

Figure 1:
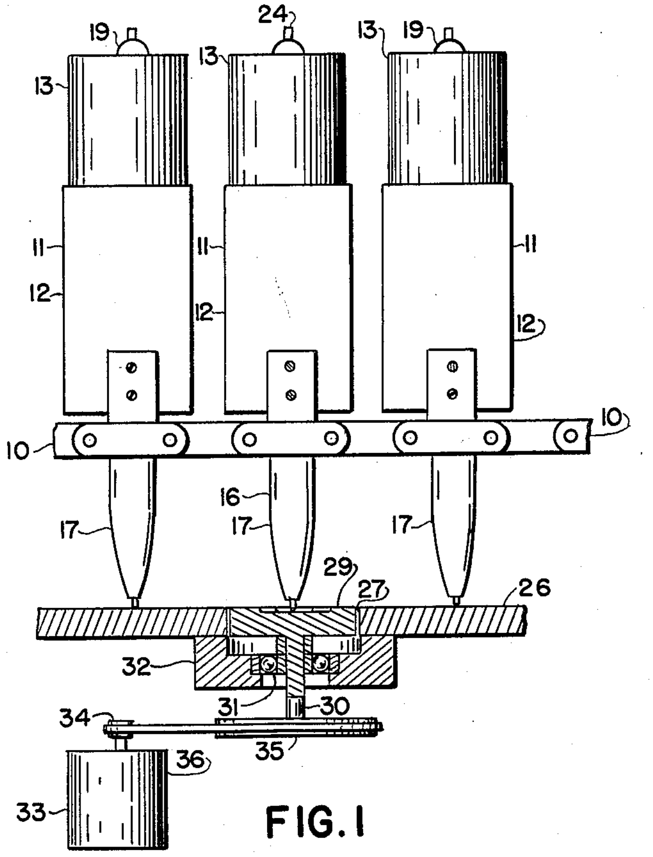
FIGURE 1 is a side view of a fragment of a chain carrying pen holding elements into which the elements of ball point pens have been dropped and FIGURE 1 shows a slide plate in vertical section containing the device of this invention.
Figure 4:
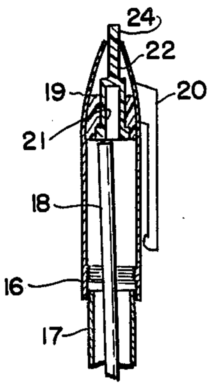
FIGURE 4 is a longitudinal vertical section through a pen cap containing an action and the upper fragments of a pen barrel and a pen cartridge, the cartridge being shown cocked to the side so that it cannot properly enter the pen action.

As shown in FIGURES 1 and 4, the ball point pens 16 being assembled have their barrels 17 first dropped into the pen holding elements 11. The cartridges 18 with their lower springs (not shown) are then dropped into the barrels 17. Finally, the caps 19 are dropped into the pen holding elements 11 over the cartridges 18 and over the barrels 17. The clips 20 of the caps 19 extend into one of the vertical slots 15.

The chain 10, or other means supporting the elements

11, is intermittently advanced from station to station moving each element 11 to a given position and then holding it stationary for a period of time. After the elements of the ball point pens 16 have been dropped into the pen holding elements 11, rotating rubber rollers, or any other suitable device (not shown), grips the pen barrels 17 and rotates them within the pen holding elements 11. Since the caps are held from rotation by the clips 20 extending into the vertical slots 15, the barrels will be screwed onto the caps to complete the assembly of a pen 16.

However, as is shown in FIGURE 4, a cartridge 18 may not extend into the bore 21 of a push rod actuator 22. The push rod actuator 22 extends upward to terminate in a push end 24. If a cartridge 18 does not extend into the bore 21 of a push rod actuator, the cap 19 will not screw properly onto a barrel 17 as the barrel and cap will be held apart. Further, the cartridge 18 will be held in a fully extended position and will not be able to be retracted.

As the pen holding elements move along, the pen barrels 17 are prevented from falling out of the elements 11 by a slide plate 26 which extends below the path of the elements 11. According to this invention, a circular aperture 27 is cut in the slide plate 26 in a place where the pen holding elements 11 intermittently come to rest. A circular plate 29 is mounted on top of shaft 30 which is rotatably journalled by bearing 31 which, in turn, is supported below slide plate 26 in the support block 32.

A motor 33 rotates shaft 30 and circular plate 29 by any suitable drive means such as the pulleys 34 and 35 and the belt 36.

Figure 2:
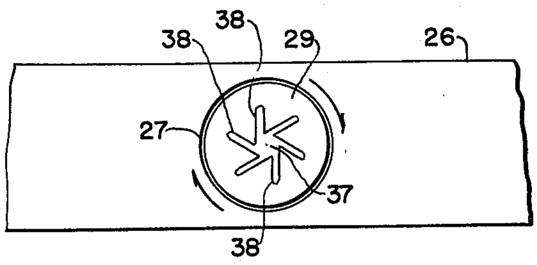
FIGURE 2 is a top view of the slide plate of FIGURE 1.

Referring now to FIGURE 2, it may be seen that a central depression 37 is formed in the top surface of the circular plate 29. A number of spiral grooves 38 extend outward from the central depression spiraling outward in the direction of rotation of plate 29. Therefore, as plate 29 rotates and a pen cartridge and barrel rest upon it, the point of the pen cartridge and the front of the barrel will be drawn in to the central depression 37 by the spiral arms or grooves 38 to align the pen cartridge 18 and allow it to enter bore 21. The circular plate 29 should rotate at a moderate speed of at least 1,800 r.p.m. Since the central depression 37 and the spiral grooves 38 are shallow cuts in plate 29, spiral grooves passing under an off center cartridge will cause it to move or vibrate up and down to more easily enter bore 21. If a cartridge 18 is aligned and within bore 21 when an element 11 moves the elements of a pen 16 over plate 29, the cartridge 18 rests smoothly within depression 37 and is not affected.

While I have shown and described my invention in the best form known to me, it will nevertheless be understood that this is purely exemplary and that modifications may be made without departing from the spirit and scope of my invention except as it may be more limited in the appended claim wherein I claim:

A cartridge aligning and assembling device for use with a ball point pen assembly machine having pen holding elements containing a vertical bore, intermittently advanced support means to which said pen holding elements are attached, and a slide plate disposed below the path of said pen holding elements, each of said pen holding elements receiving a ball point pen assembly having a cartridge and a ball point pen cap containing a push rod actuator having a bore to receive and to be telescoped and assembled over a cartridge to be aligned therewith; said cartridge aligning and assembly device comprising a rotatably mounted circular plate, said slide plate containing a circular aperture slightly larger than said circular plate within which said circular plate is disposed flush with said slide plate, and means rotating said circular plate, said circular plate containing a central depression and spiral grooves extending outward from the central depression in the direction of rotation of said circular plate, said spiral grooves being adapted to align a cartridge resting thereon with the bore of a push rod actuator and to allow the cartridge to enter said bore so that said bore is telescoped and assembled over the cartridge.

References Cited by the Examiner

UNITED STATES PATENTS

| | | | |
|---|---|---|---|
| 2,964,840 | 12/60 | Saylor et al. | 29—203 |
| 3,081,885 | 3/63 | Carlzen et al. | 29—203 |

WHITMORE A. WILTZ, *Primary Examiner.*

THOMAS H. EAGER, *Examiner.*